United States Patent
Kao

[19]

[11] Patent Number: 6,135,012
[45] Date of Patent: Oct. 24, 2000

[54] PRESSURE COOKER

[76] Inventor: Yao-Tzong Kao, 58, Ma Yuan West St., Taichung, Taiwan

[21] Appl. No.: 09/533,274

[22] Filed: Mar. 22, 2000

[51] Int. Cl.[7] .............................. A23L 1/00; A47J 27/00; A47J 27/06; A47J 37/00; H05B 1/02

[52] U.S. Cl. .............................. 99/331; 99/337; 99/403; 219/492; 219/497; 219/453; 219/506; 220/314; 220/316; 220/912

[58] Field of Search .............................. 99/325–333, 337, 99/338, 403–410, 447–450, 483; 126/369, 39 G, 39 R; 219/492, 494, 497, 506, 453, 452, 448, 501; 220/592, 246, 314–316, 393, 486, 489, 912; 324/663, 686; 426/510, 511, 523, 231, 233

[56] References Cited

U.S. PATENT DOCUMENTS

| | | | |
|---|---|---|---|
| 3,806,701 | 4/1974 | Scott | 219/438 X |
| 3,908,111 | 9/1975 | Du Bois et al. | 219/442 |
| 4,005,645 | 2/1977 | Janssen | 99/403 |
| 4,039,777 | 8/1977 | Baker | 219/442 X |
| 4,298,789 | 11/1981 | Eichelberger et al. | 219/521 X |
| 4,307,287 | 12/1981 | Weiss | 219/432 X |
| 4,932,527 | 6/1990 | Hayes | 99/331 |
| 5,348,187 | 9/1994 | Schultz | 126/373 X |
| 5,355,777 | 10/1994 | Chen et al. | 99/410 X |
| 5,400,700 | 3/1995 | Bois | 99/403 |
| 5,520,103 | 5/1996 | Zielinski et al. | 126/246 X |
| 5,673,611 | 10/1997 | Tieman | 99/415 X |
| 5,701,805 | 12/1997 | Sa | 99/331 |

*Primary Examiner*—Timothy Simone

[57] ABSTRACT

A pressure cooker has a main body, a cover disposed on the main body, an air vent valve disposed on the cover, a base seat, an aluminum disk, an electric heating pipe, and a temperature control device. The base seat has a hollow interior, and a chamber. The electric heating pipe is disposed in the base seat. The aluminum disk is disposed on the electric heating pipe. The hollow interior of the base seat receives a bottom of the main body. The temperature control device is inserted in the chamber. The temperature control device has a first recess hole, a second recess hole, and a temperature sensing rod. The electric heating pipe has a first end inserted in the first recess hole, and a second end inserted in the second recess hole.

2 Claims, 5 Drawing Sheets

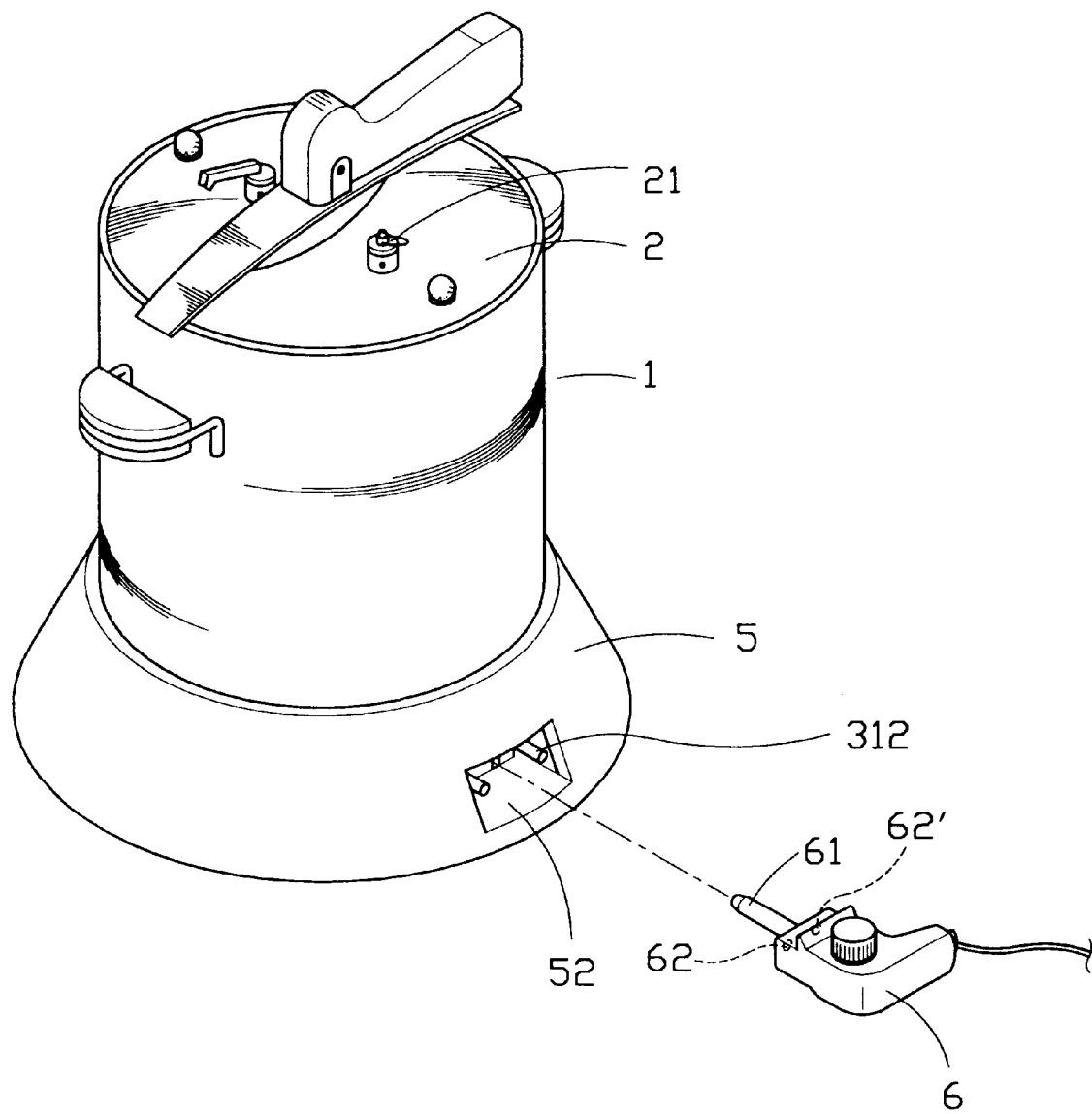
F I G. 1

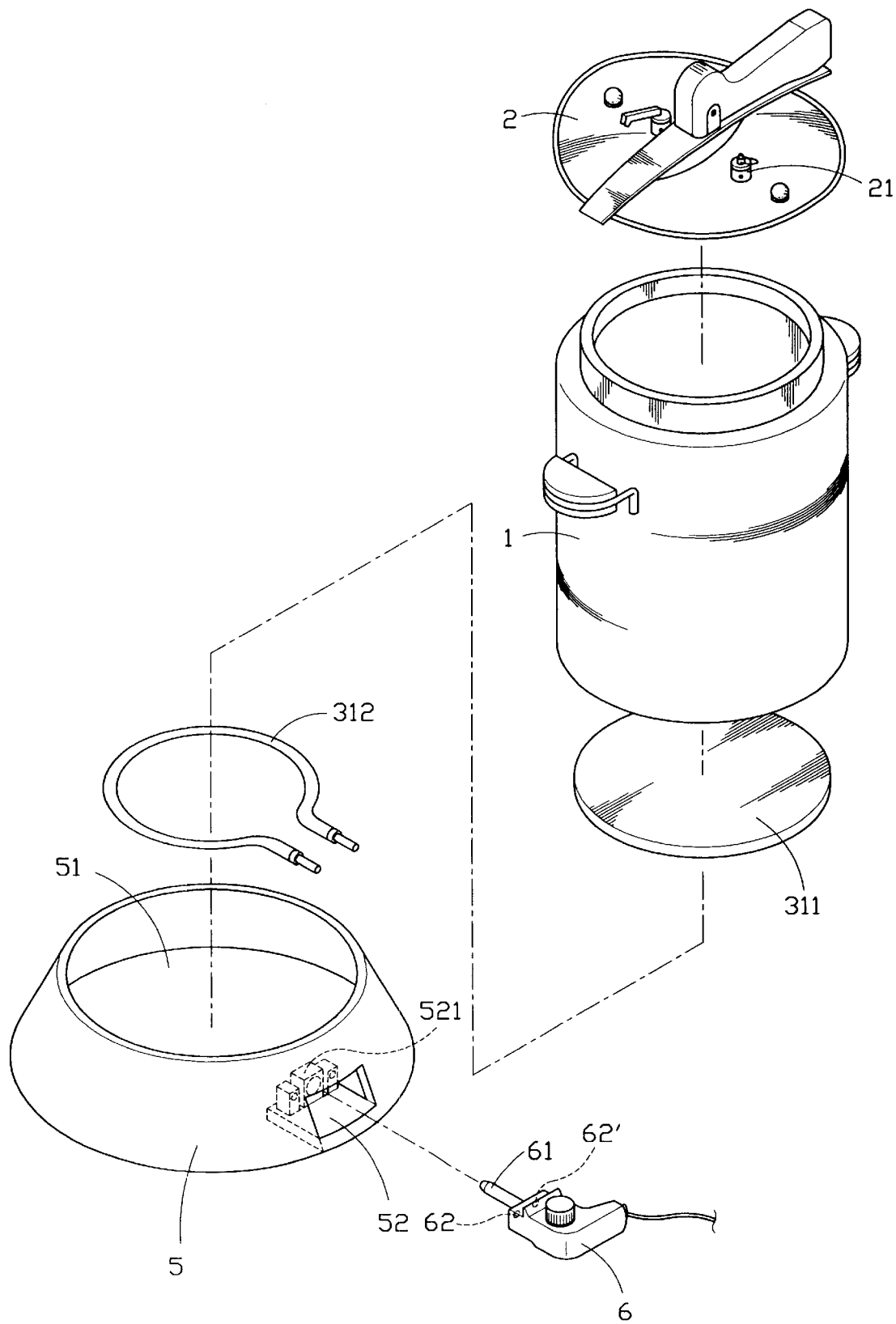
F I G. 2

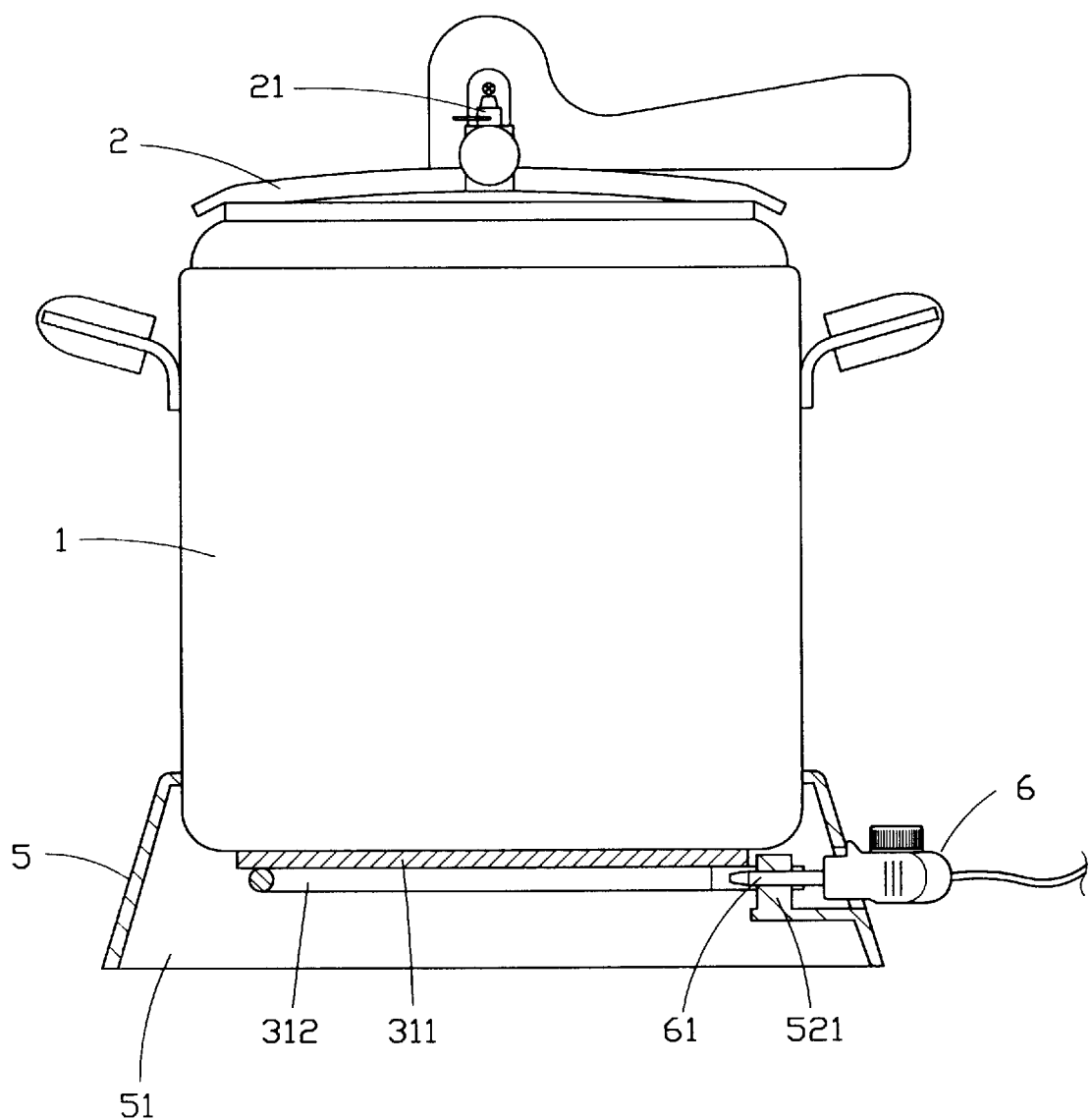
F I G. 3

PRESSURE COOKER

BACKGROUND OF THE INVENTION

The present invention relates to a pressure cooker. More particularly, the present invention relates to a pressure cooker which has a temperature control device preventing the pressure cooker from exploding.

Referring to FIG. 5, a conventional pressure cooker has a main body 10, a cover 20 disposed on the main body 10, and an air vent valve 210 disposed on the cover 20. However, the air vent valve 210 will be choked while powdered beans are cooked therein. Therefore, the inner pressure of the conventional pressure cooker will increase significantly and the conventional pressure cooker will explode.

SUMMARY OF THE INVENTION

An object of the present invention is to provide a pressure cooker which has a temperature control device preventing the pressure cooker from exploding.

Accordingly, a pressure cooker comprises a main body, a cover disposed on the main body, an air vent valve disposed on the cover, a base seat, an aluminum disk, an electric heating pipe, and a temperature control device. The base seat has a hollow interior, and a chamber. The electric heating pipe is disposed in the base seat. The aluminum disk is disposed on the electric heating pipe. The hollow interior of the base seat receives a bottom of the main body. The temperature control device is inserted in the chamber. The temperature control device has a first recess hole, a second recess hole, and a temperature sensing rod. The electric heating pipe has a first end inserted in the first recess hole, and a second end inserted in the second recess hole.

BRIEF DESCRIPTION OF THE DRAWINGS

FIG. 1 is a perspective view of a pressure cooker of a preferred embodiment in accordance with the present invention;

FIG. 2 is a perspective exploded view of a pressure cooker of a preferred embodiment in accordance with the present invention;

FIG. 3 is a sectional assembly view of a pressure cooker of a preferred embodiment in accordance with the present invention;

DETAILED DESCRIPTION OF THE INVENTION

Figure 4:
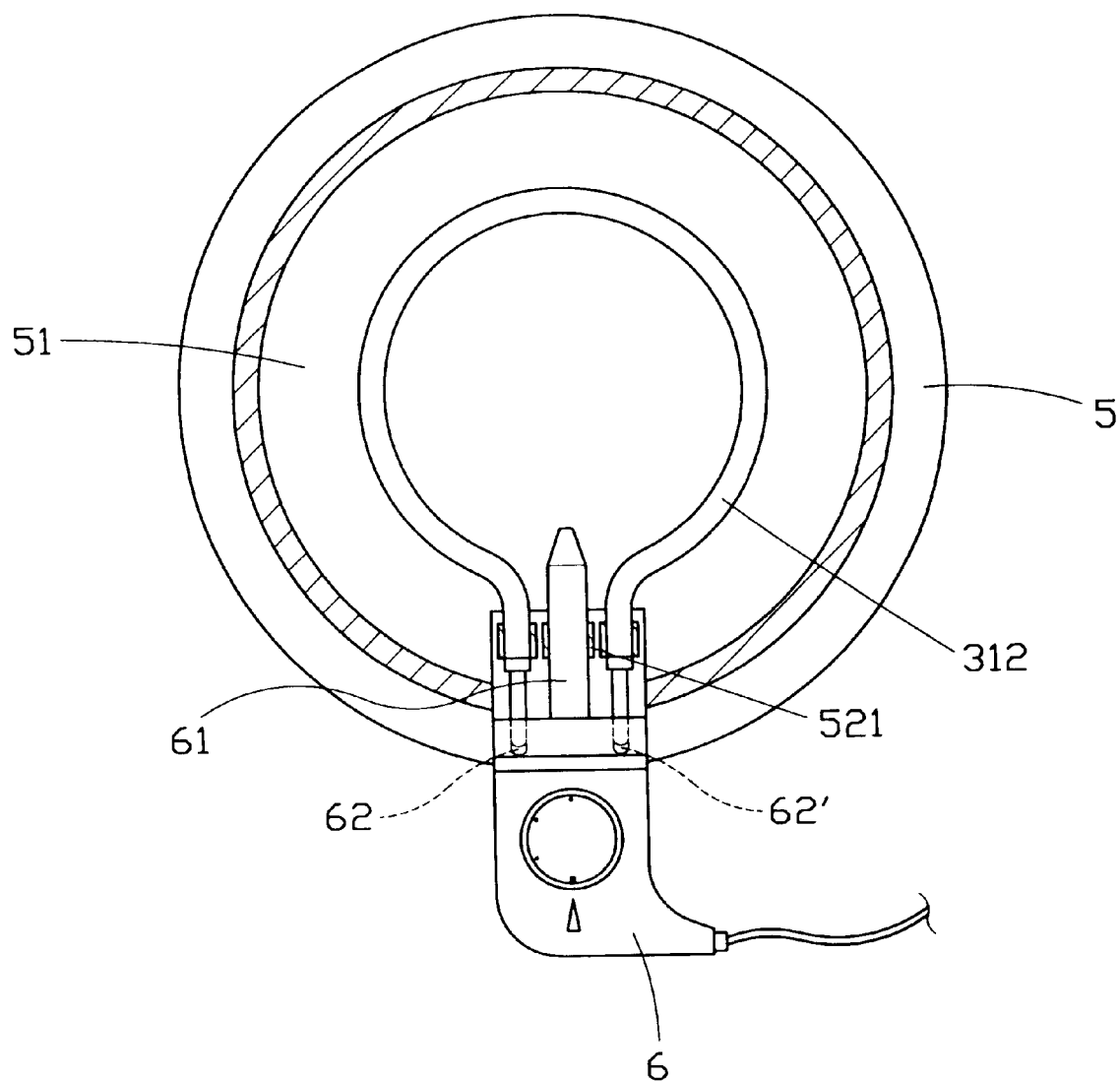
FIG. 4 is another sectional assembly view of a pressure cooker of a preferred embodiment in accordance with the present invention.
Figure 5:
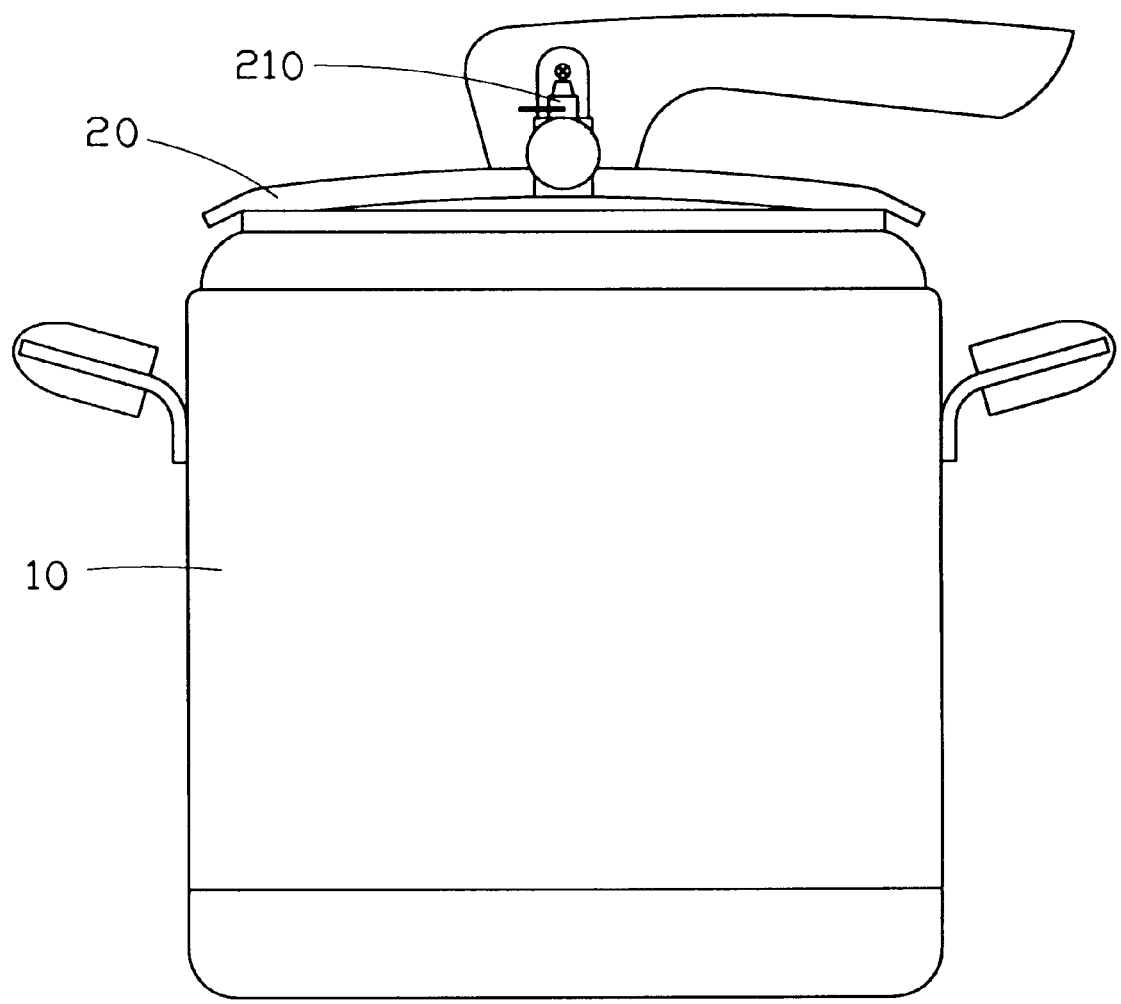
FIG. 5 is an elevational view of a pressure cooker of the prior art.

Referring to FIGS. 1 to 4, a pressure cooker comprises a main body 1, a cover 2 disposed on the main body 1, an air vent valve 21 disposed on the cover 2, a base seat 5, an aluminum disk 311, an electric heating pipe 312, and a temperature control device 6.

The base seat 5 has a hollow interior 51, a chamber 52, and a positioning mount 521 disposed in the chamber 52.

The electric heating pipe 312 is disposed in the base seat 5. The aluminum disk 311 is disposed on the electric heating pipe 312.

The hollow interior 51 of the base seat 5 receives a bottom of the main body 1.

The temperature control device 6 is inserted in the chamber 52. The temperature control device 6 has a first recess hole 62, a second recess hole 62', and a temperature sensing rod 61 inserted in the positioning mount 521.

The electric heating pipe 312 has a first end inserted through the positioning mount 521 and inserted in the first recess hole 62, and a second end inserted through the positioning mount 521 and inserted in the second recess hole 62'.

When the inner temperature of the base seat 5 is too high, the temperature sensing rod 61 will control the temperature control device 6 to be in an off-state.

The present invention is not limited to the above embodiment but various modification thereof may be made. Furthermore, various changes in form and detail may be made without departing from the scope of the present invention.

I claim:

1. A pressure cooker comprising:

a main body, a cover disposed on the main body, an air vent valve disposed on the cover, a base seat, an aluminum disk, an electric heating pipe, and a temperature control device, the base seat having a hollow interior and a chamber, the electric heating pipe disposed in the base seat, the aluminum disk disposed on the electric heating pipe, the hollow interior of the base seat receiving a bottom of the main body, the temperature control device inserted in the chamber, the temperature control device having a first recess hole, a second recess hole, and a temperature sensing rod, and the electric heating pipe having a first end inserted in the first recess hole, and a second end inserted in the second recess hole.

2. The pressure cooker as claimed in claim 1, wherein a positioning mount is disposed in the chamber.

* * * * *